July 24, 1934.  F. E. WOLCOTT  1,967,984
SEAL
Filed Nov. 27, 1931
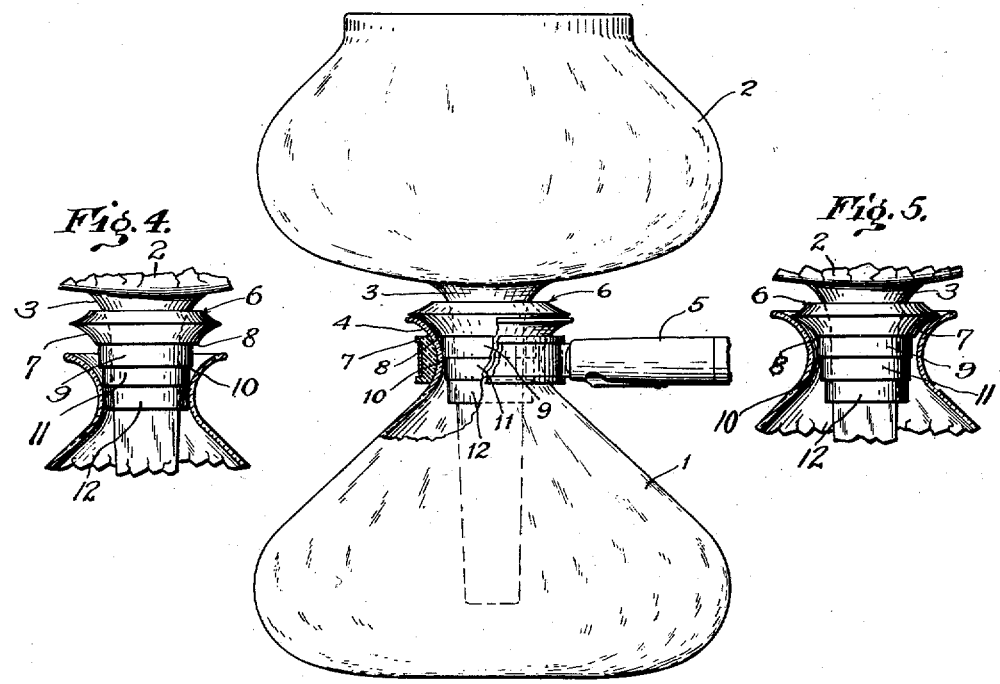
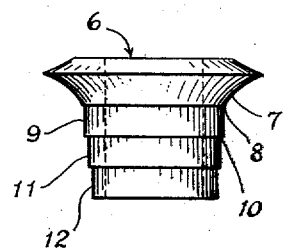
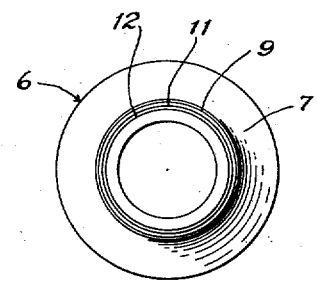
INVENTOR
FRANK E. WOLCOTT
BY
ATTORNEY.

Patented July 24, 1934

1,967,984

UNITED STATES PATENT OFFICE 1,967,984

SEAL

Frank E. Wolcott, West Hartford, Conn., assignor to The Silex Company, a corporation of Connecticut Application November 27, 1931, Serial No. 577,644

20 Claims. (Cl. 53—3)

My invention relates to seals.

It has heretofore been proposed to make multiple stopples for ordinary straight neck bottles by superimposing a series of stopples of different diameter with each stopple adapted to fit only a given diameter of bottle neck and of cylindrical shape or, if tapered, of larger diameter at its lower end, while the bottle neck is also sealed at the top by engagement with the bottom of the next upper stopple. These multiple stopples are, however, wholly unadapted for use in coffee makers, wherein the seal should desirably be of approximately the length of only one of the stopples thereof, while the cylindrical or upwardly tapering surfaces of any single stopple of such prior art devices is wholly unadapted to effective sealing in a coffee maker bowl neck of the varying diameter inherent in such glass bowls as are used in coffee makers, and particularly in such bowls having a portion of minimum diameter and an upper bell mouth. Seals of what may be called the single stopple type and especially adapted for coffee makers have also been proposed, but these likewise have been defective for various reasons, primarily because of inability to obtain a conformation of the sealing area on the seal which would permit the latter to function effectively in neck sizes of different diameter inherent in the manufacture of the glass bowls of such coffee makers, while avoiding the necessity for jamming in the seal and difficulty in extracting the same when the upper bowl is hot, and at the same time producing the desired vertically compact support for the upper bowl and also effectually preventing tilting of the latter.

My invention has for its object to provide an improved seal, and, more particularly, an improved seal of the type adapted to use in glass coffee makers or the like between the stem of the upper bowl and the neck of the lower bowl. A further object of my improved construction is to produce such a seal which is particularly adapted to use in lower bowls having bell-mouthed necks, and one which is effective despite wide variations in the minimum inside, or throat diameter of the neck of the lower bowl, and which further is adapted to maintain the stem, and accordingly the upper bowl, in the desired vertical relation to the lower bowl, free from "cocking", despite these variations, while also being readily inserted and removed from the neck of the latter bowl. These and other advantages of my improved construction will, however, hereinafter more fully appear.

In the accompanying drawing, I have shown for purposes of illustration, one embodiment which my invention may assume in practice.

In this drawing,—

Figure 1 is a side elevation of a coffee maker equipped with my improved seal, portions of the neck of the lower bowl and of the handle connection being broken away to facilitate illustration;

Fig. 2 is a side elevation of the seal per se;

Fig. 3 is a bottom plan view of the same;

Figure 4 is a detail view similar to Figure 1, showing the seal in a small diameter neck; and Figure 5 is a like view showing the seal in a large diameter neck.

In this illustrative construction, I have shown my improved seal applied to the bowls of a coffee maker including a lower bowl 1 and an upper bowl 2, the latter having a stem 3 extending down through a convexly curved bell-mouthed neck 4 of the lower bowl, and my improved seal being carried on this stem 3 and disposed in the neck 4 while any usual type of handle 5 is suitably connected to the outside of the neck 4 of the bowl 1.

My improved seal generally indicated at 6 is preferably formed of soft, live rubber or other equivalent material. While being adapted to be provided with any suitable form of upper end projecting above the top of the neck 4, it is herein provided with a lower end of an improved combined supporting and sealing construction. More particularly, it will be noted that the latter herein comprises a laterally projecting curved portion 7 adjacent its top having a concave annular under surface which seats inside the top of the neck 4 and herein is terminated at 8 by an adjacent lower reduced portion 9 of slightly smaller diameter and preferably cylindrical in form. This portion 9, in turn, is connected by a step 10 to a corresponding still smaller cylindrical portion 11 presenting another similar step, while a corresponding cylindrical step presenting portion 12 of even smaller diameter is on the lower end of the seal. While the relative diameters of the different portions 9, 11 and 12 may be varied, it will be noted that herein the portions 11 and 12 differ in diameter from one another by the same amount that the diameter of the portion 11 differs from that of the portion 9, while the difference in the diameter of the latter portion and the diameter of the lower end of the curved portion 7 is slightly less. Thus it will be noted that an improved seal is produced which is not only adapted to engage the neck 4 of the bowl 1 on the convexly curved portion of the latter in such manner as to support and maintain both the seal 6 and the upper bowl 2 securely in the desired vertical position, free from lateral "cocking", but one which also is so constructed as to present a plurality of steps or sealing edges formed by the lower edges of the plurality of portions 9, 11 and 12 of decreasing diameter and disposed between the curved portion and the lower extremity of the seal, all in such manner as to be adapted to provide an improved construction which is effective under varying conditions.

In Figures 4 and 5 I have illustrated my improved seal in bowls having a relatively wide range of neck diameter, as ordinarily encountered in practice due to the variation inherent in the manufacture of bowls of glass. These figures represent the extremes in neck size with which my seal can be used while obtaining a seal in the bowl neck. In Figure 4, in which a neck of small diameter is shown, it will be noted that the engagement with the neck takes place lower down on the seal body than in Figure 1, the lower stepped surface of the seal engaging the neck at the portion of minimum neck diameter, providing an annular band of engagement therewith, while the lower edge of the stepped surface next above likewise engages the neck providing a second and vertically spaced band of engagement, either or both of which bands may effect a seal and one of which even though not providing a seal further effectively braces the upper bowl unit against cocking or tilting. Both the above mentioned supporting and sealing functions are obtained without the necessity for compressing the seal by jamming it down into the bowl neck while also, it will be noted, the usual difficulty of removing the upper bowl caused by the tendency of the rubber of the seal to stick or cleave to the hot glass is practically eliminated, since the area of engagement between the seal and neck is reduced to a fraction of that I have hereto found necessary. In Figure 5, while the lower steps do not engage the bowl neck to provide a seal, it will be noted that the uppermost step engages upon severe tilting of the upper bowl and the seal is effectively formed on the curved portion 7 of the seal, the weight of the upper bowl unit being sufficient to insure a seal in this case.

In the use of my improved seal, it will be evident that when the same is placed in bowls having necks of different minimum inside diameter, the lower edges of the stepped portions 9, 11 and 12 will provide an effective seal regardless of wide variations in the diameter of the neck. Thus, if the steps are so disposed as to extend in a graduated series between the limits of tolerance allowed the bowl manufacturer as to the inside diameter of the bowl neck, these steps will insure a satisfactory seal despite the variation within those limits of the particular bowl. For example, if the inside neck diameter is such as to approach the maximum limit, the top step will engage and seal the same, whereas if the neck diameter is smaller, the steps lower down will function, all in such manner as to provide an effective seal for any neck size between the limits of tolerance. Further, it will be evident that since the stepped construction is thus adapted to fit in the neck in an effective manner, an exceedingly stable support is provided for the stem 3 on the upper bowl, and one which, regardless of variations in the minimum, or throat diameter, of the neck of the lower bowl, will serve to position the upper bowl in the desired vertical position free from "cocking". It will, of course, also be evident that while providing effective sealing and such a stable support, the seal is also readily insertable in or removable from the neck of the lower bowl with a minimum of pushing or pulling upon the insertion or removal of the upper bowl, the portion 7 being readily seated and supported on the upper convex periphery of the neck 4 and inside the latter, while the steps are so constructed and disposed below the portion 7 as to have their lower edges provide effective seals without requiring jamming in of the plug. In fact, the construction is such that the mere weight of the upper bowl ordinarily is sufficient to seal and locate the parts satisfactorily and with only a slight additional twisting required in any event, while removal is as readily effected.

In practice it is found that at least one of the annular stepped surfaces engages the lower bowl neck to form a narrow, continuous sealing band at or above the point of minimum diameter of the neck, and that one of the stepped surfaces adjacent the sealing surface, irrespective of whether or not it makes such continuous engagement as to form a seal, provides a narrow annular bracing, or abutment band, spaced either above or below the sealing band, which acts effectively to position the upper bowl against tilting or cocking. At the same time it will be noted that due to the new narrow sealing band an effective seal is produced and one which is more easily made and broken than formerly without the necessity for compressing the seal by jamming it into the bowl throat. Further, due to the limited area of sealing engagement between the stepped seal and the lower bowl neck, the former difficulty of breaking the seal and removing the upper bowl and attached seal from the lower bowl, caused by cleavage or sticking of the seal to the glass, is satisfactorily overcome.

As a result of this invention, it is made possible to eliminate a source of substantial difficulty in effectively sealing and definitely positioning the upper bowl of coffee makers of the glass bowl type, and particularly such coffee makers having convexly curved bell-mouthed necks above their most constricted portion, in all of which the difficulty arises from the apparent impossibility of producing all lower bowls with exactly the same minimum, or throat diameters, a considerable variation in the neck size of such bowls being apparently inherent in glass manufacture. As a result of my invention, however, the difficulty due to this inherent variation in neck size is overcome to such an extent as no longer to be a disturbing factor, either as regards sealing or the proper positioning of the upper bowl, while at the same time, it is made possible to insert or remove the bowl with increased facility and without need for jamming or pulling.

It will further be noted that my improved seal not only provides a more stable support for the upper bowl against tilting while effectively sealing the same in the lower bowl neck in a wholly new manner free from jamming, but that these desirable ends are achieved in a bowl having a neck of minimum diameter. This latter is an important consideration since, following a coffee making operation, the upper bowl with the seal thereon is removed and the coffee is dispensed from the lower bowl so that any increase in neck diameter not only makes pouring more difficult but results in an undesirable rapid cooling of the coffee in the bowl during use. For example, with a bowl neck of a given large diameter, it is found that the coffee is cold by the time that a leisurely user reaches his third cup, whereas with a given smaller bowl neck, the coffee is still of proper temperature. The seal of the present invention, by reason of the fact that it is normally bodily disposable within the vertical limits of the sealing portion of the lower bowl neck, has the further advantage that it permits a vertical compactness of the upper and lower bowls and hence a stability of the upper bowl, impossible with the prior art seals and especially impossible with one following the teaching of the previously mentioned multi-stopple seals comprising a plurality of superimposed stopples, only one of which is adapted to be located within the sealing portion of the receptacle neck at any one time. These and other advantages of my improved construction will however be clearly apparent to those skilled in the art.

While I have in this application specifically described one form which my invention may assume in practice, it will be understood that this form of the same is shown for illustrative purposes, and that the same may be modified and embodied in various other forms without departing from its spirit or the scope of the appended claims. For example, while I have shown the preferred form of my improved seal as having three steps and having the upper tapered supporting portion above the steps formed with a concave surface, it will be understood that the advantages of my invention may be obtained in a large measure by employing a single step, or by forming the upper supporting surface as a straight taper, or both.

What I claim as new and desire to secure by Letters Patent is:—

1. A seal for coffee makers or the like comprising a single sealing stopple having an upper supporting portion and a lower stepped series of sealing edges disposed on a smaller tapered portion, a plurality of said sealing edges being simultaneously disposable within the vertical limits of the sealing portion of a coffee maker lower bowl neck.

2. A seal for coffee makers or the like comprising a single sealing stopple having an upper tapered supporting surface and a lower end comprising a plurality of yieldable sealing edges of different diameters and so disposed that an extension of a line touching said edges would intersect the lower end of said tapered surface.

3. A seal for coffee makers or the like comprising a single sealing stopple having an upper laterally protruding supporting portion provided with a concave under face, and also having a tapered lower end presenting a plurality of sealing edges of decreasing diameters spaced from one another by a portion of smaller diameter than one of the same.

4. A seal for coffee makers or the like comprising a single sealing stopple having an upper laterally protruding supporting portion provided with a concave under face, and also having below said portion a plurality of cylindrical portions of different diameters disposed in a series tapering toward the lower end of the seal.

5. A seal for bell-mouthed apertures, having a concavely curved upper laterally projecting supporting portion and a stepped sealing portion below the same comprising steps of successively smaller diameters than said curved portion.

6. A seal for the convexly curved bell-mouthed apertures of coffee maker bowls or the like, having a concavely curved upper laterally projecting tapered supporting portion and a cooperating stepped tapered sealing portion comprising a plurality of substantially cylindrical portions of diminishing diameters below the lower end of said concavely curved portion and disposed on a smaller taper, a plurality of said cylindrical portions being simultaneously disposable within the vertical limits of the sealing portion of said apertures.

7. A seal for bell-mouthed apertures, having a concavely curved upper laterally projecting supporting portion and a stepped sealing portion below the same of smaller diameter than said curved portion and having said supporting portion stiffened to inhibit longitudinal folding over of the latter on said sealing portion.

8. A seal for coffee makers or the like comprising a single sealing stopple having an axial aperture therethrough, and having a single outer sealing area of diminishing diameter toward its lower end and comprising a pair of spaced sealing portions one above the other, the lower portion being of smaller diameter than the minimum diameter of the upper portion, and a step therebetween reducing the diameter of the lower portion.

9. A seal for coffee makers or the like comprising a single sealing stopple having an axial aperture therethrough, and having a single outer sealing area of diminishing diameter toward its lower end and comprising a series of spaced sealing portions one above another and shallow steps between adjacent ends of a pair of sealing portions and reducing the diameter of the lower portion.

10. A seal for coffee makers or the like comprising a plug having an axial aperture therethrough and a tapered outer supporting and sealing surface comprising a laterally projecting supporting portion and a plurality of stepped yieldable cylindrical portions of diminishing diameters below the same presenting a tapered series of spaced yieldable sealing edges so disposed that an extension of a line touching said edges would intersect said supporting portion between its top and bottom, a plurality of said sealing edges being simultaneously disposable within the vertical limits of the sealing portion of a coffee maker lower bowl neck.

11. In a coffee maker, the combination with a lower bowl having an upstanding tubular neck, the inner wall of which is covexly curved at the top and has a lower throat of minimum diameter, and an upper bowl having a tubular stem depending therefrom and adapted to extend through said neck into said lower bowl, of a fluid sealing member fitted on said stem within said neck, said sealing member having a plurality of annular stepped surfaces comprising a series of sealing surfaces of diminishing diameter in the direction of its lower end and a step therebetween, one of which surfaces engages said curved neck in a narrow continuous band at or above its portion of minimum diameter to form a seal.

12. In a coffee maker, the combination with a lower bowl having an upstanding tubular neck, the inner wall of which is convexly curved and presents an intermediate throat of minimum diameter, and an upper bowl having a tubular stem depending therefrom and adapted to extend through said neck into said lower bowl, of a fluid sealing member fitted on sa'd stem within said neck, said sealing member having a plurality of annular stepped surfaces providing a series of sealing edges of diminishing diameters in the direction of its lower end, one of which surfaces engages said curved neck in a narrow continuous band at or above its portion of minimum diameter to form a seal while another adjacent surface also engages said neck and forms an abutment positioning said upper bowl against cocking.

13. In a coffee maker, the combination with a lower bowl having an upstanding tubular neck, the inner wall of which is convexly curved to provide an intermediate restricted throat terminating in an upper expanding mouth, and an upper bowl having a tubular stem depending therefrom and adapted to extend through said neck into said lower bowl, of a fluid sealing member fitted on said stem within said neck having provisions for supporting said upper bowl in an upright position on said convexly curved neck including an upper laterally projecting tapered supporting portion and a lower tapered portion of substantially lesser taper and comprising a plurality of stepped surfaces forming annular sealing edges of diminishing diameters in the direction of the lower end of said member, at least one of which is engageable with the mouth portion of said neck in a narrow band regardless of substantial variation in the neck diameter of the lower bowl.

14. In a coffee maker, the combination with a lower bowl having an upstanding neck, the inner wall of which is convexly curved to provide an intermediate restricted throat portion and an upwardly and outwardly expanding bowl supporting portion, and an upper bowl having a tubular stem depending therefrom and adapted to extend through said neck into said lower bowl, of a fluid sealing member fitted on said stem within said neck having provision for supporting said upper bowl in an upright position on the supporting portion of said lower bowl, said sealing member having a tapered outer surface comprising a plurality of stepped surfaces forming vertically spaced annular sealing edges of diminishing diameters in the direction of the lower end of said member one of which surfaces engages said neck in a narrow continuous sealing band while another and adjacent surface engages said neck and forms an abutment positioning said upper bowl against cocking, the taper of said sealing member being such that a line touching the several sealing edges thereof would describe a lesser taper than the curved line defining the expanding bowl supporting portion of said lower bowl neck.

15. The combination in a coffee maker having a lower bowl provided with an upstanding neck, the inner convexly curved wall of which defines a throat portion of minimum diameter and an upper bell-mouthed bowl supporting orifice, an upper bowl having a stem extending into said neck, and a plug carried on said stem and disposed in said neck, of an upper tapered flange on said plug, and a plurality of spaced sealing edges on said plug below said flange engageable with said neck only at or above said throat portion in different vertical positions dependent on the inside diameter of said neck, one of said edges being below the lower end of the taper on said flange and of substantially the diameter of the lower end of said taper and another edge being spaced below said edge and of smaller diameter than the latter.

16. In a coffee maker, the combination with a lower bowl having an upstanding tubular neck, the passage through which has a portion of minimum diameter, and an upper bowl having a stem depending through said neck and into said lower bowl, of a fluid sealing member on said upper bowl seated within said neck having a plurality of external annular stepped surfaces normally disposed in superimposed relation within the vertical limits of the sealing area of the neck and of diminishing diameter in the direction of its lower end disposable at different heights in necks of different diameter, one of which surfaces engages said neck passage in a narrow continuous sealing band at or above the portion of minimum diameter of said neck irrespective of variations in neck diameter.

17. In a coffee maker, the combination with a lower bowl having an upstanding tubular neck, the passage through which has a throat portion of minimum diameter, and an upper bowl having a depending tubular stem adapted to extend through said neck into said lower bowl, of a fluid sealing member on said upper bowl seated in said neck having a plurality of external annular sealing surfaces normally disposed in superimposed relation within the vertical limits of the sealing area of the neck and providing a series of sealing edges of diminishing diameter in the direction of the lower end of said body, so positioned as not to offer greater resistance when withdrawing said seal than when inserting the same in said neck, one of which surfaces and an adjacent edge engage said neck in narrow bands of engagement at or above the portion of minimum diameter of said neck irrespective of variations in diameter of said portion.

18. In a coffee maker, the combination with a lower bowl having an upstanding tubular neck, the passage through which has a throat portion of minimum diameter, and an upper bowl having a depending tubular stem adapted to extend through said neck into said lower bowl, of a fluid sealing member comprising a flexible body disposable about said upper bowl and seated in said neck having a plurality of external annular sealing surfaces normally disposed in superimposed relation within the vertical limits of the sealing area of the neck and providing a series of flexible sealing lower edges on said surfaces and of diminishing diameter in the direction of the lower end of said body, one of which edges engages said neck in a narrow continuous sealing band narrower than said surfaces at or above its portion of minimum diameter irrespective of variations in neck diameter.

19. In a coffee maker, the combination with a lower bowl having an upstanding tubular neck, the inner wall of which presents a throat of minimum diameter, and an upper bowl having a tubular stem depending therefrom and adapted to extend through said neck into said lower bowl, of a fluid sealing member fitted on said stem within said neck, said sealing member having a sealing portion normally disposable within the vertical limits of the sealing portion of the lower bowl neck and providing a series of annular sealing edges of diminishing diameters in the direction of its lower end, of which adjacent edges are vertically spaced apart by portions of smaller diameter than one of said edges, and at least one of which edges engages said neck in a narrow continuous sealing band at or above the portion of minimum diameter of said neck.

20. In a coffee maker, the combination with a lower bowl having an upstanding tubular neck, the inner wall of which presents a throat having a portion of minimum diameter and terminates in a flared lip, and an upper bowl having a tubular stem depending therefrom and adapted to extend through said neck into said lower bowl, of a fluid sealing member fitted on said stem within said neck, said sealing member having a plurality of annular stepped surfaces comprising a pair of sealing surfaces of diminishing diameter in the direction of its lower end and a step effecting a reduction in diameter between said surfaces, one of which surfaces engages said throat portion in a narrow continuous band at or above its portion of minimum diameter to form a seal while the adjacent surface also engages said neck and forms an abutment positioning said upper bowl against cocking.

FRANK E. WOLCOTT.

CERTIFICATE OF CORRECTION.

Patent No. 1,967,984.            July 24, 1934.

FRANK E. WOLCOTT.

It is hereby certified that error appears in the printed specification of the above numbered patent requiring correction as follows: Page 4, line 59, claim 15, after "flange" insert the words certain of which are; and that the said Letters Patent should be read with this correction therein that the same may conform to the record of the case in the Patent Office.

Signed and sealed this 16th day of October, A. D. 1934.

Leslie Frazer (Seal)            Acting Commissioner of Patents.

of annular stepped surfaces comprising a pair of sealing surfaces of diminishing diameter in the direction of its lower end and a step effecting a reduction in diameter between said surfaces, one of which surfaces engages said throat portion in a narrow continuous band at or above its portion of minimum diameter to form a seal while the adjacent surface also engages said neck and forms an abutment positioning said upper bowl against cocking.

FRANK E. WOLCOTT.

CERTIFICATE OF CORRECTION.

Patent No. 1,967,984.            July 24, 1934.

FRANK E. WOLCOTT.

It is hereby certified that error appears in the printed specification of the above numbered patent requiring correction as follows: Page 4, line 59, claim 15, after "flange" insert the words certain of which are; and that the said Letters Patent should be read with this correction therein that the same may conform to the record of the case in the Patent Office.

Signed and sealed this 16th day of October, A. D. 1934.

Leslie Frazer (Seal)                      Acting Commissioner of Patents.